Aug. 22, 1967  R. B. SYMONS  3,336,653
ADJUSTABLE TOOL POSITIONING AND ALIGNING DEVICE
Filed Feb. 25, 1965  2 Sheets-Sheet 1

INVENTOR
RALPH B. SYMONS
BY,
*Russell, Chittick & Pfund*
ATTORNEYS

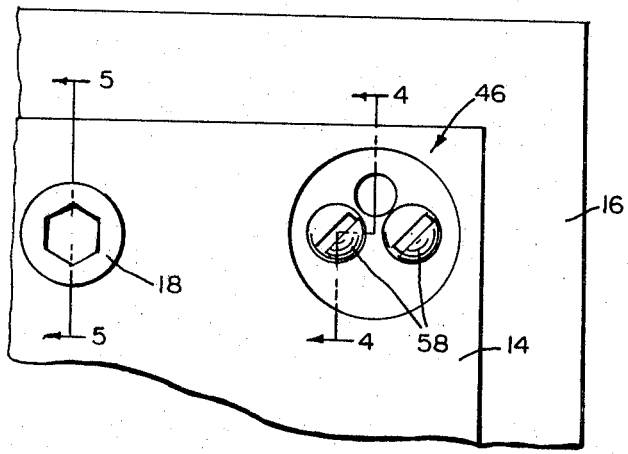
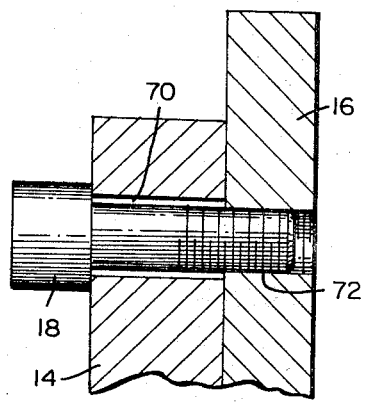
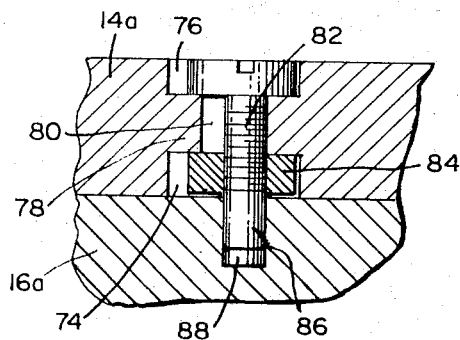
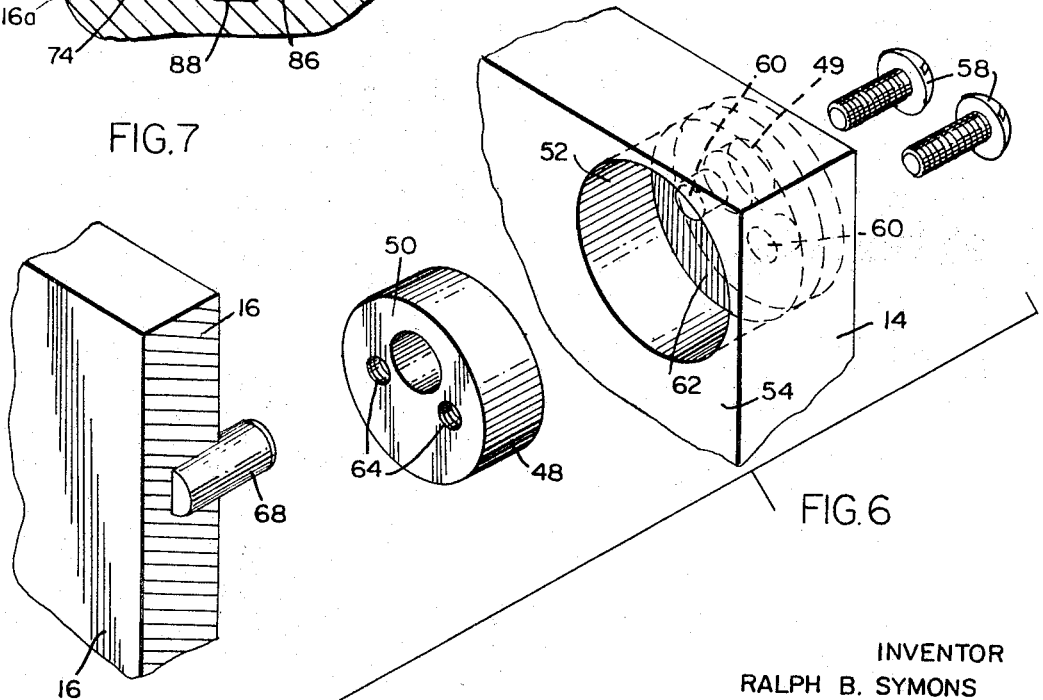

United States Patent Office 3,336,653
Patented Aug. 22, 1967

3,336,653
ADJUSTABLE TOOL POSITIONING AND
ALIGNING DEVICE
Ralph B. Symons, 3571 Main Road,
Tiverton, R.I. 02878
Filed Feb. 25, 1965, Ser. No. 435,182
3 Claims. (Cl. 29—271)

This invention relates to an improved tool positioning and aligning means and more particularly to a device which once adjusted, will permit a tool member to be repeatedly and accurately mounted in an operative position with a minimum expenditure of time and effort on the part of operating personnel.

The problem of quick and accurate tool positioning is one that has yet to be solved to the complete satisfaction of those skilled in the art. This is particularly true of manufacturing operations requiring frequent tool changes. Although there are devices in existence which provide the desired level of accuracy in tool alignment or positioning, use of such devices invariably requires considerable time and skill on the part of operating personnel. For example, tools are frequently positioned by means of spaced locating pins on adjacent supporting members. Apertures are accurately and painstakingly drilled into the tool members to receive the locating pins and the tools are aligned relative to the supporting members by seating the pins in these apertures. The slightest inaccuracy in the drilling operation will of course adversely affect proper tool positioning. Thus it can be seen that extreme care and skill is required in accurately locating the pin receiving apertures if the desired precision in a subsequent manufacturing operation is to be obtained. This is a time consuming operation and one which adds substantially to tooling costs.

The present invention offers a solution to the forementioned problems by making it possible to repeatedly and accurately position a tool member relative to its base or supporting structure without resorting to precision time consuming preliminary set up operations such as is now required with conventional devices. In the preferred embodiment of the invention, this is accomplished by employing novel alignment devices which will hereinafter be referred to as "floating bushings." Each floating bushing is comprised basically of a disc movably mounted on the tool member in a manner which permits it to be readily adjusted and thereafter locked in place. The bushing contains a suitably dimensioned aperture adapted to receive a locating pin which is fixed to the base or supporting structure on which the tool is to be mounted. With this arrangement, the tool (having at least two floating bushings thereon) is initially mounted on the base with locating pins on the base extending into the apertures in the bushings. Since the floating bushings are movable relative to the tool, the tool can then be accurately positioned on the base prior to locking the bushings in place relative to the tool. Once the bushings are locked in place, the position of the tool relative to its base or supporting structure is fixed. The tool can then be removed and thereafter remounted in an accurately aligned position by simply reseating the locating pins within the pin receiving apertures.

Another object of the present invention is to provide a tool aligning and positioning device which is simple in design with a minimum number of moving parts.

A further object of the present invention is to provide a tool aligning and positioning device which may be quickly and efficiently adjusted with a minimum expenditure of time.

Another object of the present invention is to provide means for repeatedly and efficiently positioning a tool member without loss of desired accuracy.

A further object of the present invention is to provide a tool aligning and positioning device which may be preset and thereafter repeatedly utilized when repositioning interchangeable tool sets.

Another object of the present invention is to greatly simplify the task of positioning pin receiving apertures on the tool member. More particularly, the present arrangement does away with the necessity of accurately drilling pin receiving apertures in fixed locations on the tool member. The apertures are instead drilled into movable or floating bushings. The final position of the bushings is determined when initially setting the tool into the desired operative position.

A further object of the present invention is to provide a low cost tool aligning and positioning device carried on the tool assembly, said device capable of being initially adjusted when positioning the tool in its operative position.

These and other objects of the present invention will become more apparent as the description proceeds with the aid of the accompanying drawings in which:

FIG. 3 is an enlarged partial view in elevation of the fixed punch shown in FIG. 2;

FIG. 5 is a sectional view taken along line 5—5 of FIG. 3;

FIG. 6 is an exploded perspective view of the invention taken from the rear of the base plate shown in FIGS. 1 and 2; and, FIG. 7 is a sectional view similar to FIG. 4 showing an alternate embodiment of the invention.

The invention will hereinafter be described in connection with a machine utilized in forming powdered, granular or fibrous material into compressed forms suitable for subsequent processing operations. These machines are commonly referred to as "preformers." However, it should be understood that the invention is not limited to this type of machine and in fact may be utilized wherever accurate tool positioning is a pre-requisite to the successful performance of a manufacturing operation.

Figure 1:
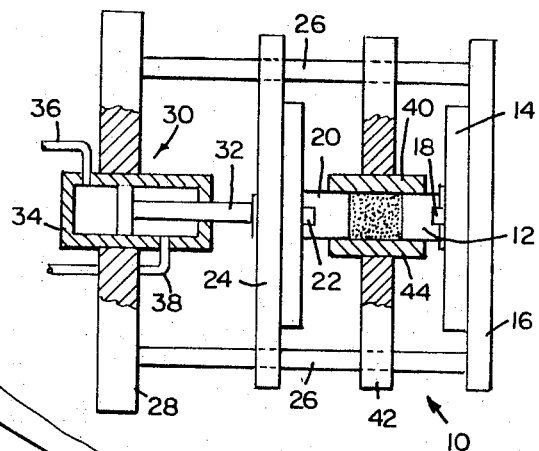
FIG. 1 is a diagrammatic plan view partially in section showing a conventional machine embodying the concepts of the present invention.
Figure 2:
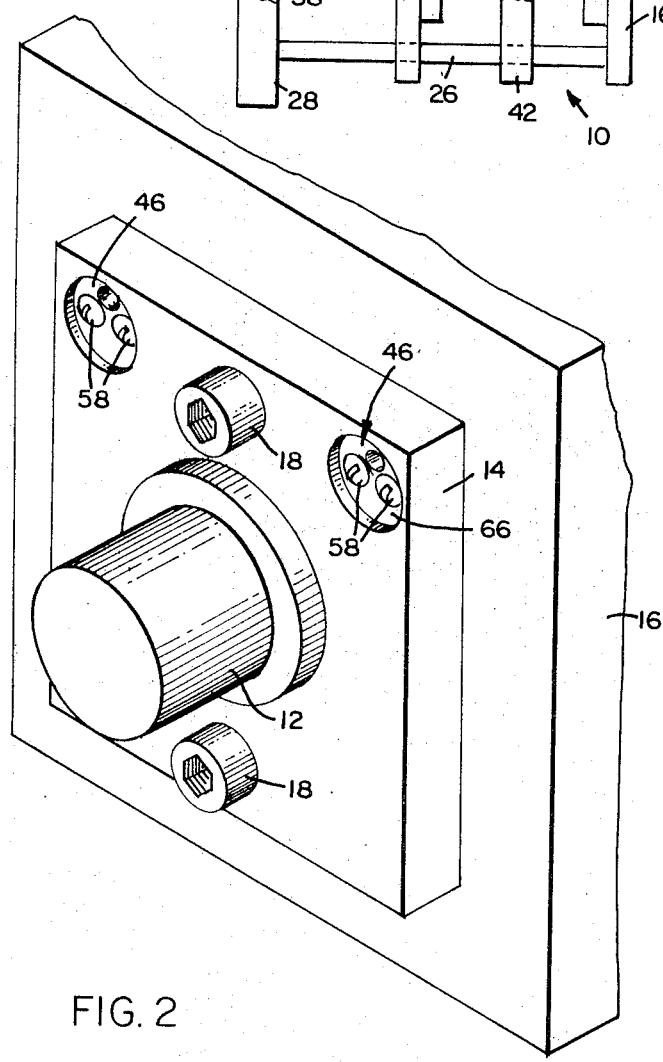
FIG. 2 is an enlarged perspective view of a portion of the machine illustrated in FIG. 1, showing the fixed punch mounted on a stationary base plate.

Referring now to FIGS. 1 and 2, a conventional preformer generally referred to by the reference numeral 10 is shown comprised of a stationary punch 12 extending outwardly from a back plate 14. The back plate is in turn mounted on a stationary base plate 16 and fixed thereto by means of retaining bolts 18. A movable punch 20 is similarly fixed by means of retaining bolts 22 to a movable plate 24. Movable plate 24 is supported and guided for reciprocal movement towards and away from base plate 16 by guide rods 26 which extend between the base plate 16 and another fixed member 28.

Movement is imparted to plate 24 by means of a hydraulically operated ram 30 which is comprised of a piston 32 reciprocally contained within a cylinder 34 supported by fixed member 28. Ram 30 is of the double acting type with fluid connections as at 36 and 38. With this arrangement, movable punch 20 may be advanced towards stationary punch 12 by injecting pressurized fluid into cylinder 34 through hydraulic connection 36 while at the same time bleeding fluid through connection 38. By the same token, movable punch 20 may be withdrawn by injecting fluid into the cylinder through fluid connection 38 while simultaneously bleeding fluid from connection 36. Operation of movable punch 20 is governed by a control valve (not shown) in a conventional manner and thus, will not be described to any further extent.

A die 40, herein shown for illustrative purposes as being generally annular in shape, is supported between the stationary and movable punches 12 and 20 by means of a die plate 42 also movably mounted on guide rods 26. Die 40 is positioned on plate 42 in alignment with punches 12 and 20 by conventional means (not shown) forming no part of the present invention. Movement is imparted to the die plate in a conventional manner by a second hydraulic ram which has also been omitted from the drawings in the interest of simplification and clarity.

In operation the preformer performs as follows: the stationary and movable punches 12 and 20 and the die 40 are first arranged as shown in FIG. 1 through proper positioning of movable plate 24 and die plate 42. When so positioned, die 40 has been moved to the right until axially inserted over the end of stationary punch 12. By the same token, movable punch 20 has been advanced until its end is axially inserted into the other side of die 40. This results in the formation of an enlarged cavity 44 into which is placed the material to be compressed. Once this has been accomplished, movable punch 20 is further advanced to compress the material between the end of stationary punch 12 and the inner wall of die 40. Movable punch 20 is then retracted, the compacted material ejected from the die and the components returned to the position shown in FIG. 1 prior to repeating the same cycle.

In view of the above, it should be evident that if costly tool damage is to be avoided, extreme care must be taken to position the stationary and movable punches 12 and 20 and the die 40 in accurate alignment. This is particularly true where the cooperating die and punches have complex irregular cross-sectional configurations, as is often the case in actual practice.

In actual operation, a particular combination of punches and dies must often be interchanged for another having a different configuration in order to accommodate a change in the size or shape of the compressed product being produced. Prior to the present invention, no satisfactory means was available for quickly and accurately positioning the punches in concentric alignment with the die. To illustrate, the most commonly employed conventional procedure entails manually adjusting the position of each punch in relation to the die every time a change in the shape or size of the product is required. This is a time consuming and exhausting operation and one which considerably lengthens set up time with a corresponding loss of production time.

As an alternative to the above, the punches and die are sometimes pre-assembled into an accurately aligned tool set which may be subsequently mounted into the machine as a unit. Although this procedure effectively shortens set up time, this advantage is completely offset by an accompanying 50–100% increase in tool costs. These problems have now been effectively overcome by the present invention, a more detailed description of which will hereinafter be presented with reference to the remaining drawings.

The invention resides in a novel tool positioning and alignment device, a preferred embodiment of which is generally referred to in FIGS. 1–7 by the reference numeral 46. As shown in FIG. 2, two such devices are employed to align and position back plate 14 on base plate 16. The actual number of devices utilized in positioning a particular tool member may however be varied to suit particular circumstances and is not to be considered as a limitation upon the scope of the present invention.

In its preferred embodiment, the invention is comprised basically of a disc or bushing 48 (preferably hardened for greater resistance to wear) having a pin receiving aperture 50 extending therethrough. Bushing 48 is seated within an enlarged cavity 52 in the rear face 54 of back plate 14. The outer diameter of bushing 48 in relation to the inner diameter of cavity 52 is such that an annular space 56 is provided therebetween. In this manner, the bushing is free to move in any direction within cavity 52 and for this reason, has been termed a "floating bushing."

Bushing 48 is retained within cavity 52 by means of two screws 58 extending through enlarged holes 60 in an intermediate shelf 62. The screws are threaded into tapped holes 64 in the bushing. Shelf 62 is an integral part of back plate 14 formed between cavity 52 and an opposed recess 66 of lesser depth in the front face of the back plate. Bushing 48 and screws 58 have been illustrated in a disassembled exploded relationship in FIG. 6.

In view of the above, it can be seen that when screws 58 are loosened, floating bushing 48 will be permitted to move about within cavity 52 to the extent permitted by annular space 56 and the clearance 61 existing between screws 58 and the enlarged holes 60 in intermediate shelf 62. However, the bushing may be drawn against intermediate shelf 62 and locked in place at any desired position by simply tightening screws 58.

Figure 4:
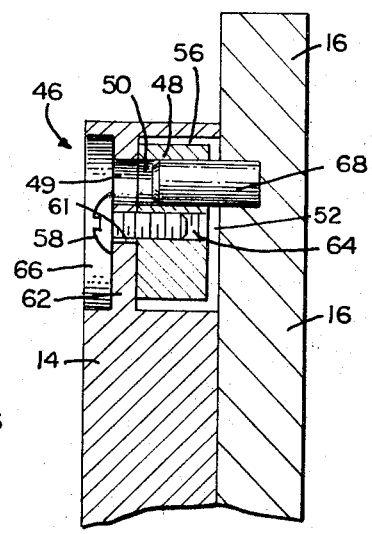
FIG. 4 is a sectional view taken along line 4—4 of FIG. 3.

As can be best seen in FIG. 4, base plate 16 is provided with fixed locating pins 68. Two identical alignment and positioning devices 46 are incorporated in back plate 14. When positioning the tool for the first time with locating pins 68 already in place on base plate 16, the following procedure is observed: screws 58 are first loosened to permit floating lateral movements of both bushings 48 relative to back plate 14 within their respective cavities 52. Back plate 14 is then mounted against base plate 16 with the locating pins 68 extending into the pin receiving apertures 50 in the bushings. The larger retaining bolts 18 are then passed through enlarged hole 70 in back plate 14 and threaded into base plate 16 as at 72. At this stage, bolts 18 are not tightened in order to permit movement of back plate 14 relative to base plate 16. The permissible lateral movement of back plate 14 relative to base plate 16 will be limited by the clearances between bolts 18 and holes 70, which clearances may if desired be made approximately equal to the clearances 61 between screws 58 and the enlarged holes 60 in the intermediate shelf 62. The position of back plate 14 relative to base plate 16 is then adjusted until the longitudinal axis of stationary punch 12 is concentrically aligned with that of the intermediate female die 40. Once this has been accomplished, retaining bolts 18 are tightened to lock back plate 14 in position against base plate 16. With the back plate locked in the desired position, screws 58 are then tightened to fix the position of floating bushings 48 within their respective cavities 52. This results in the pin receiving apertures 50 being precisely aligned with locating pins 68 when the back plate 14 is in the desired position.

Having thus adjusted and fixed floating bushings 48 relative to back plate 14, the back plate may be removed and subsequently repositioned in exact alignment by simply remounting it against base plate 16 with the locating pins 68 inserted into apertures 50. The same arrangement can of course be utilized to mount movable punch 20 against movable plate 24. It can therefore be seen that once the punches have been accurately positioned in accordance with the above-outlined procedure, they may then be remounted whenever needed with minimum set up time.

It should also be noted that by utilizing the present invention, the task of accurately positioning locating pins 68 in a back plate 16 can be greatly simplified. To illustrate, when a back plate is without locating pins, as for example on a new machine, the following initial set up operation may be followed: (a) centrally position the floating bushings 48 within the cavities 52 by temporarily inserting locating pins 68 through the pre-drilled apertures 49 and 50 in the shelf 62 and bushing 48 respectively; (b) lock the bushings 48 in place relative to the back plate 14 by tightening screws 58; (c) mount the back plate 14 to the base plate 16, align it by conventional methods and then lock it in place by tightening retaining bolts 18; (d) the locating pins may then be removed from their temporary positions extending through aligned holes 49 and 50 and the bushings 48 utilized as drilling and reaming fixtures to guide the positioning of holes in base plate 16; (e) once the base plate has been drilled, back plate 14 can be removed and the locating pins 68 driven into place.

This procedure may be followed to position accurately spaced locating pins on a number of machines. Thereafter, tool sets embodying the locating devices of the type herein described may be set up on one machine and then freely interchanged between any of the other machines because each set of locating pins will have been initially provided with the same precise spacing.

Referring now to FIG. 7, an alternate embodiment of the invention is shown in connection with the alignment of a modified back plate 14a on a base plate 16a. The back plate is provided at selected points with opposed cavities 74 and 76 separated by an intermediate shelf 78 having an enlarged hole 80 drilled therethrough. A stud 82 extends through hole 80 to be threaded through a bushing 84 loosely contained within cavity 74. The stud which is of a smaller diameter than hole 80, is provided with a dowel extension 86 at its lower end suitably dimensioned for relatively tight axial insertion into a dowel receiving aperture 88 in base plate 16a.

When initially aligning back plate 14a on base plate 16a with this arrangement, the studs 82 are first loosened to permit their movement relative to the back plate within the confines of holes 80. The back plate is then mounted on base plate 16a with the dowel ends 86 of the studs 82 inserted into the dowel receiving apertures 88. Once this has been accomplished, back plate 14a is aligned in a conventional manner and the studs 82 thereafter tightened to fix the positions of the dowel ends 86 relative to the back plate 14a. The back plate may thereafter be removed and subsequently remounted in accurate alignment by simply reseating the preset dowel ends 86 into the dowel receiving apertures 88.

In view of the above, it can now be seen that although the invention has been described in connection with the positioning of stationary and movable punches in a preformer, its concepts are not restricted to this use and may be applied wherever accurate location of one device relative to another is necessitated.

It is my intention to cover all changes and modifications of the embodiments herein chosen for purposes of disclosure which do not depart from the spirit and scope of the invention.

I claim:

1. Means for aligning a first member on a second member comprising: spaced pins located at fixed points on said second member; bushings carried by said first member, each said bushings having a pin receiving aperture adapted to receive one of said pins in axial insertion therein, said bushings being capable of multi-directional lateral movement in enlarged openings in said first member; and, means for fixing said bushings relative to said first member when the latter is aligned on said second member.

2. The apparatus as set forth in claim 1 wherein the means for fixing said bushings relative to said first member is comprised of at least one screw extending through an enlarged aperture in said first member into threaded engagement with each said bushings, the radial clearance between said screw and the walls of said aperture being such as to accommodate the said multi-directional lateral movement of said bushings relative to said first member.

3. Means for aligning a removable member in relation to fixed spaced pins on a base member, said means comprising: non-rotatable bushing members carried by said removable member for lateral multi-directional movement in relation thereto, said bushing members each having a pin receiving aperture adapted to receive one of said pins in axial insertion therein; and, screw means for fixing said bushing members relative to said removable member when the desired alignment of the latter relative to said base member has been achieved.

References Cited
UNITED STATES PATENTS

| | | | |
|---|---|---|---|
| 2,868,339 | 1/1959 | Lazarowicz | 29—464 X |
| 2,889,396 | 6/1959 | Boden et al. | 29—464 X |
| 2,972,386 | 2/1961 | Tanke | 29—464 X |
| 3,006,443 | 10/1961 | Siler | 29—464 X |
| 3,099,470 | 7/1963 | Zumbusch | 29—464 X |
| 3,218,723 | 11/1965 | McAfee | 29—271 X |

WILLIAM FELDMAN, Primary Examiner.

MYRON C. KRUSE, BERNARD A. GELAK,
Examiners.